(12) United States Patent
Zhu

(10) Patent No.: US 9,392,519 B2
(45) Date of Patent: Jul. 12, 2016

(54) APPARATUS, SYSTEM AND METHOD OF TUNNELING DATA RADIO BEARERS VIA A WIRELESS LOCAL AREA NETWORK LINK

(71) Applicant: Intel Corporation, Santa Clara, CA (US)

(72) Inventor: Jing Zhu, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 66 days.

(21) Appl. No.: 14/312,246

(22) Filed: Jun. 23, 2014

(65) Prior Publication Data

US 2015/0373607 A1 Dec. 24, 2015

(51) Int. Cl.
| | |
|---|---|
| *H04W 4/00* | (2009.01) |
| *H04W 36/22* | (2009.01) |
| *H04W 76/02* | (2009.01) |
| *H04W 84/12* | (2009.01) |

(52) U.S. Cl.
CPC ............ *H04W 36/22* (2013.01); *H04W 76/022* (2013.01); *H04W 84/12* (2013.01)

(58) Field of Classification Search
CPC .................................................... H04W 48/20
See application file for complete search history.

(56) References Cited

U.S. PATENT DOCUMENTS

| | | |
|---|---|---|
| 2006/0023683 A1 | 2/2006 | Lee et al. |
| 2006/0045049 A1 | 3/2006 | Chung et al. |
| 2014/0050086 A1* | 2/2014 | Himayat ............ H04N 21/2365 370/230 |
| 2014/0071925 A1* | 3/2014 | Liu ....................... H04W 28/08 370/329 |
| 2014/0204927 A1* | 7/2014 | Horn ....................... H04W 8/26 370/338 |
| 2014/0334446 A1* | 11/2014 | Lim ...................... H04W 48/20 370/331 |
| 2015/0043447 A1* | 2/2015 | Stojanovski .............. H04L 5/14 370/329 |
| 2015/0271716 A1* | 9/2015 | Son ................... H04W 36/0055 455/436 |

FOREIGN PATENT DOCUMENTS

WO 2013147486 10/2013

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

3GPP TR 23.852 V12.0.0 (Sep. 2013), 3rd Generation Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12), Sep. 2013, 157 pages.

(Continued)

*Primary Examiner* — Maharishi Khirodhar
(74) *Attorney, Agent, or Firm* — Shichrur & Co.

(57) ABSTRACT

Some demonstrative embodiments include devices, systems of tunneling data radio bearers via a wireless local area network link. For example, an Evolved Node B (eNB) may communicate with a User Equipment (UE) traffic of a plurality of Data Radio Bearers (DRBs) via a cellular link; establish an offloading tunnel between the UE and the eNB to tunnel the DRBs via a Wireless Local Area Network (WLAN) link, the offloading tunnel including one or more User Datagram Protocol (UDP) tunneling connections configured to differentiate between the plurality of DRBs; and coordinate with the UE a handover of at least one DRB of the plurality of DRBs to the offloading tunnel.

25 Claims, 5 Drawing Sheets

(56) References Cited

OTHER PUBLICATIONS

ETSI TS 123 402 V11.8.0 (Dec. 2013), Universal Mobile Telecommunications System (UMTS); LTE; Architecture enhancements for non-3GPP accesses (3GPP TS 23.402 version 11.8.0 Release 11), Dec. 2013, 254 pages.

ETSI TS 125 331 V11.7.0 (Oct. 2013), Universal Mobile Telecommunications System (UMTS); Radio Resource Control (RRC); Protocol specification (3GPP TS 25.331 version 11.7.0 Release 11), Oct. 2013, 2102 pages.

International Search Report and Written Opinion for PCT/US2015/031895, mailed on Sep. 8, 2015, 10 pages.

'3GPP; TSGRAN; Study on WLAN/3GPP radio interworking (Release 12)', 3GPP TR 37.834 V1.3.0, Feb. 26, 2014, 19 pages.

Ericsson, 'Handling of RAN assistance parameters', R2-142369, 3GPP TSG-RAN WG2 #86, Seoul, South Korea, May 10, 2014, 3 pages.

* cited by examiner

APPARATUS, SYSTEM AND METHOD OF TUNNELING DATA RADIO BEARERS VIA A WIRELESS LOCAL AREA NETWORK LINK

TECHNICAL FIELD

Some embodiments described herein generally relate to tunneling data radio bearers via a wireless local area network link.

BACKGROUND

A wireless communication device, e.g., a mobile device, may be configured to utilize multiple wireless communication technologies.

For example, a User Equipment (UE) device may be configured to utilize a cellular connection, e.g., a Long Term Evolution (LTE) cellular connection, as well as a wireless-local-area-network (WLAN) connection, e.g., a Wireless-Fidelity (WiFi) connection.

There exists a need for solutions to enhance a level of cooperation and/or integration between co-located WLAN and cellular networks.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
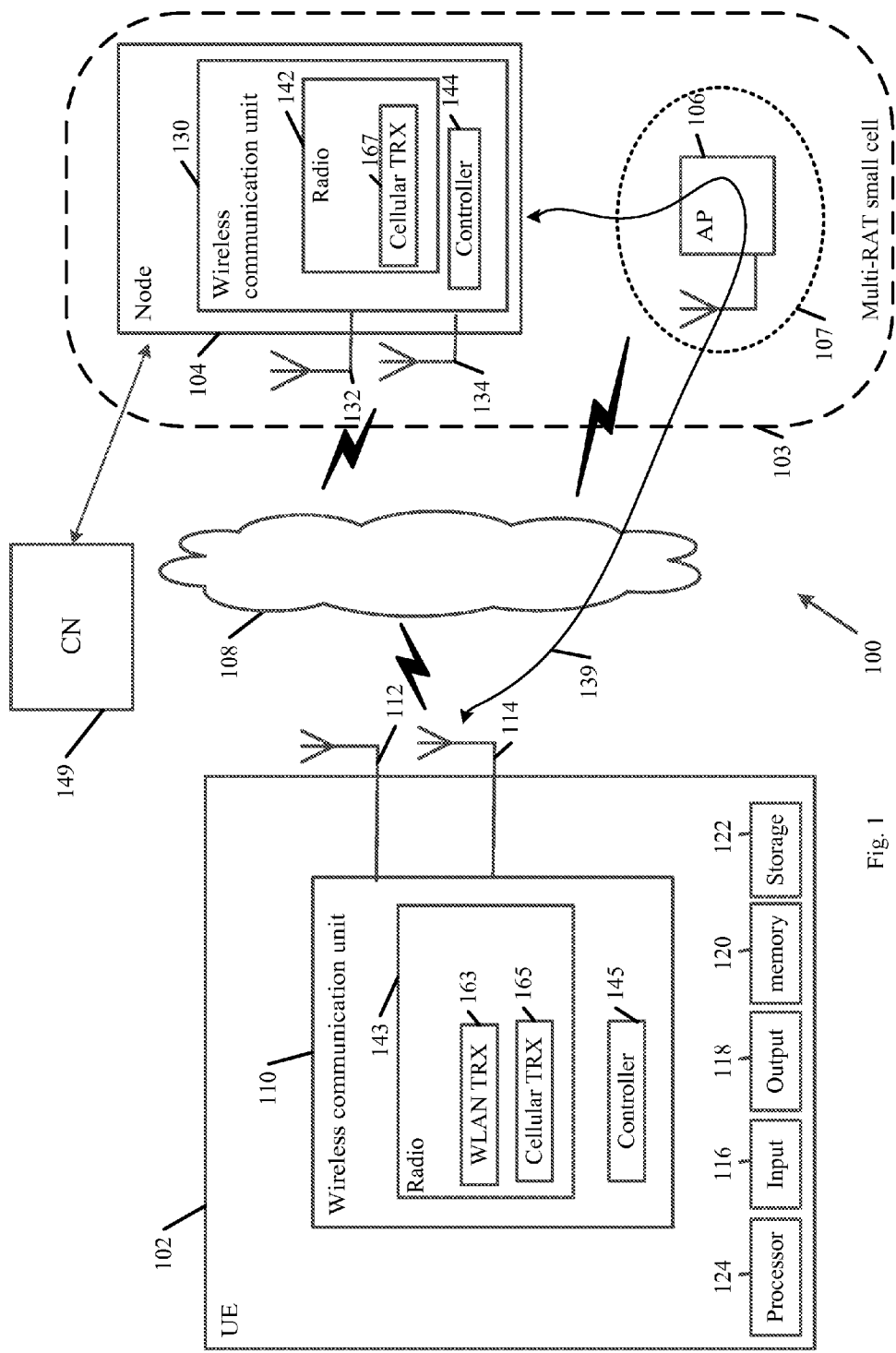
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a cellular network, a cellular node, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including "*3GPP TS 25.331: Universal Mobile Telecommunications System (UMTS); Radio Resource Control (RRC); Protocol specification*", Release 11, Version 11.7.0, October 2013; and "*3GPP TS 23.402: Universal Mobile Telecommunications System (UMTS); LTE; Architecture enhancements for non-3GPP accesses*", Release 11, version 11.8.0, December 2013) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification* Version 1.1, April 2011, Final specification) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16e, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a radio, which is capable of communicating a wireless communication signal, may include a wireless transmitter to transmit the wireless communication signal to at least one other radio, and/or a wireless communication receiver to receive the wireless communication signal from at least one other radio. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments are described herein with respect to a LTE cellular system. However, other embodiments may be implemented in any other suitable cellular network, e.g., a 3G cellular network, a 4G cellular network, a 5G cellular network, a WiMax cellular network, and the like.

Some demonstrative embodiments are described herein with respect to a WLAN system. However, other embodiments may be implemented in any other suitable non-cellular network.

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells.

Other embodiments may be used in conjunction with any other wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

The phrase "access point" (AP), as used herein, may include an entity that includes a station (STA) and provides access to distribution services, via the Wireless Medium (WM) for associated STAs.

The term "station" (STA), as used herein, may include any logical entity that is a singly addressable instance of a medium access control (MAC) and a physical layer (PHY) interface to the WM.

The phrases "directional multi-gigabit (DMG)" and "directional band" (DBand), as used herein, may relate to a frequency band wherein the Channel starting frequency is above 56 GHz.

The phrases "DMG STA" and "mmWave STA (mSTA)" may relate to a STA having a radio transmitter, which is operating on a channel that is within the DMG band.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums 108. For example, system 100 may include at least one User Equipment (UE) 102 capable of communicating with one or more wireless communication networks, e.g., as described below.

Wireless mediums 108 may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, system 100 may include at least one cellular network, e.g., a cell controlled by a cellular node ("node") 104.

In some demonstrative embodiments, system 100 may include a non-cellular network 107, for example, a WLAN, e.g., a Basic Service Set (BSS), managed by an Access Point (AP) 106.

In some demonstrative embodiments, network 107 may include a trusted WLAN Access network (TWAN).

In some demonstrative embodiments, non-cellular network 107 may at least partially be within a coverage area of node 104. For example, AP 106 may be within a coverage area of node 104.

In some demonstrative embodiments, node 104 may include an Evolved Node B (eNB). For example, node 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In other embodiments, node 104 may include any other functionality and/or may perform the functionality of any other cellular node, e.g., a Node B (NB), a base station or any other node or device.

In some demonstrative embodiments, UE 102 may include, for example, a mobile computer, a laptop computer, a notebook computer, a tablet computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, UE 102, node 104 and/or AP 106 may include one or more wireless communication units to perform wireless communication between UE 102, node 104, AP 106 and/or with one or more other wireless communication devices, e.g., as described below. For example, UE 102 may include a wireless communication unit 110 and/or node 104 may include a wireless communication unit 130.

In some demonstrative embodiments, wireless communication unit 110 may be implemented in the form of a System on Chip (SoC) including circuitry and/or logic configured to perform the functionality of wireless communication unit 110; and/or wireless communication unit 130 may be implemented in the form of a SoC including circuitry and/or logic configured to perform the functionality of wireless communication unit 130, e.g., as described below.

In some demonstrative embodiments, wireless communication units 110 and 130 may include, or may be associated with, one or more antennas. In one example, wireless communication unit 110 may be associated with at least two antennas, e.g., antennas 112 and 114, or any other number of antennas, e.g., one antenna or more than two antennas; and/or wireless communication unit 130 may be associated with at least two antennas, e.g., antennas 132 and 134, or any other number of antennas, e.g., one antenna or more than two antennas.

In some demonstrative embodiments, antennas 112, 114, 132 and/or 134 may include any type of antennas suitable for transmitting and/or receiving wireless communication signals, blocks, frames, transmission streams, packets, messages and/or data. For example, antennas 112, 114, 132 and/or 134 may include any suitable configuration, structure and/or arrangement of one or more antenna elements, components, units, assemblies and/or arrays. For example, antennas 112, 114, 132 and/or 134 may include a phased array antenna, a dipole antenna, a single element antenna, a set of switched beam antennas, and/or the like.

In some embodiments, antennas 112, 114, 132 and/or 134 may implement transmit and receive functionalities using separate transmit and receive antenna elements. In some embodiments, antennas 112, 114, 132 and/or 134 may implement transmit and receive functionalities using common and/or integrated transmit/receive elements.

In some demonstrative embodiments, wireless communication unit 130 may include at least one radio 142 and at least one controller 144 to control communications performed by radio 142, and/or wireless communication unit 110 may include at least one radio 143 and at least one controller 145 to control communications performed by radio 143. For example, radios 142 and/or 143 may include one or more wireless transmitters, receivers and/or transceivers able to send and/or receive wireless communication signals, RF signals, frames, blocks, transmission streams, packets, messages, data items, and/or data.

In some demonstrative embodiments, at least one radio 143 may include a WLAN transceiver (TRX) 163 to communicate with AP 106 over a WLAN link, and a cellular transceiver 165 to communicate with node 104 over a cellular link.

In some demonstrative embodiments, radio 142 may include a cellular transceiver 167 to communicate with node 104 over the cellular link.

In some demonstrative embodiments, the WLAN link may include, for example, a Wireless Fidelity (WiFi) link, a Wireless Gigabit (WiGig) link, or any other link.

In some demonstrative embodiments, the WLAN link may include, for example, a link over the 2.4 Gigahertz (GHz) or 5 GHz frequency band, the 60 GHz frequency band, or any other frequency band.

In some demonstrative embodiments, radios 142 and/or 143 may include a multiple input multiple output (MIMO) transmitters receivers system (not shown), which may be capable of performing antenna beamforming methods, if desired. In other embodiments, radios 142 and/or 143 may include any other transmitters and/or receivers.

In some demonstrative embodiments, radios 142 and/or 143 may include a turbo decoder and/or a turbo encoder (not shown) for encoding and/or decoding data bits into data symbols, if desired. In other embodiments, radios 142 and/or 143 may include any other encoder and/or decode.

In some demonstrative embodiments, UE 102 may communicate with node 104 via at least one cellular link. For example, radios 142 and/or 143 may include OFDM and/or SC-FDMA modulators and/or demodulators (not shown) configured to communicate OFDM signals over downlink channels, e.g., between node 104 and UE 102, and SC-FDMA signals over uplink channels, e.g., between UE 102 and node 104. In other embodiments, radios 142 and/or 143 may include any other modulators and/or demodulators.

In some demonstrative embodiments, wireless communication unit 110 may establish at least one WLAN link with AP 106. For example, wireless communication unit 110 may perform the functionality of one or more STAs, e.g., one or more WiFi STAs, WLAN STAs, and/or DMG STAs. The WLAN link may include an uplink and/or a downlink. The WLAN downlink may include, for example, a unidirectional link from AP 106 to the one or more STAs or a unidirectional link from a Destination STA to a Source STA. The uplink may include, for example, a unidirectional link from a STA to AP 106 or a unidirectional link from the Source STA to the Destination STA.

In some demonstrative embodiments, UE 102, node 104 and/or AP 106 may also include, for example, one or more of a processor 124, an input unit 116, an output unit 118, a memory unit 120, and a storage unit 122. UE 102, node 104 and/or AP 106 may optionally include other suitable hardware components and/or software components. In some demonstrative embodiments, some or all of the components of one or more of UE 102, node 104 and/or AP 106 may be enclosed in a common housing or packaging, and may be interconnected or operably associated using one or more wired or wireless links. In other embodiments, components of one or more of UE 102, node 104 and/or AP 106 may be distributed among multiple or separate devices.

Processor 124 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 124 executes instructions, for example, of an Operating System (OS) of UE 102, node 104 and/or AP 106 and/or of one or more suitable applications.

Input unit 116 includes, for example, a keyboard, a keypad, a mouse, a touch-screen, a touch-pad, a track-ball, a stylus, a microphone, or other suitable pointing device or input device. Output unit 118 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by UE 102, node 104 and/or AP 106.

In some demonstrative embodiments, UE 102 may be configured utilize a cellular connection, e.g., a Long Term Evolution (LTE) cellular connection, a Universal Mobile Telecommunications System (UMTS) connection or any other cellular connection, to communicate with node 104, and a WLAN connection, e.g., a Wireless-Fidelity (WiFi) connection or any other WLAN connection, to communicate with AP 106.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In one example, system 100 may utilize a Multi-tier, Multi Radio Access technology (Multi-RAT) Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In some demonstrative embodiments, node 104 and AP 106 may be implemented as part of a Multi-RAT small cell.

In some demonstrative embodiments, node 104 and AP 106 may be co-located or connected as part of an Integrated Cellular and WLAN (ICW) multi-RAT small cell. In one example, node 104 may be configured to interface with AP 106, e.g., to enable node 104 to have interact directly with AP 106 and/or to control one or more functionalities of AP 106.

In some embodiments, node 104 and AP 104 may be implemented as part of a common device. In other embodiments, node 104 and AP 104 may be implemented as separate and/or independent devices.

In other embodiments, system 100 may implement any other architecture and/or deployment.

In some demonstrative embodiments, UE 102 may establish a plurality of Evolved Packet-switched System (EPS) bearers to connect between UE 102 and one or more elements of a Core Network (CN) 149 via node 104.

In one example, UE 102 may establish a Packet Data Network connection between UE 102 and a PDN (not shown in FIG. 1), e.g., to support one or more EPS sessions between UE 102 and the PDN. The PDN connection may be maintained over a plurality of bearers between UE 102 and the PDN. In one example, system 100 may include an LTE system, and at least one EPS bearer may be established via the PDN connection between UE 102 and a PDN Gateway (GW) (P-GW) (not shown in FIG. 1) of CN 149. The EPS bearer may include a Data Radio Bearer (DRB) between UE 102 and node 104, a S1 bearer between node 104 and a Serving Gateway (S-GW) (not shown in FIG. 1) of CN 149, and a S5 bearer between the S-GW and the P-GW. In some implementations, an Evolved UMTS Terrestrial Radio Access Network (E-UTRAN) Radio Access Bearer (E-RAB) may be established between UE 102 and the S-GW, e.g., including the DRB and the S1 bearer.

In some demonstrative embodiments, a bearer, e.g., the EPS bearer, the DRB, the S1 bearer and/or the S5 bearer, may be in the form of a virtual connection, which may provide a bearer service, e.g., a transport service with specific Quality of Service In some demonstrative embodiments, UE 102, node 104, and/or AP 106 may be configured to enable tunneling one or more DRBs between UE 102 and node 104 via the WLAN link between UE 102 and AP 106, e.g., as described below.

In some demonstrative embodiments, the ability to tunnel DRBs, e.g., of the cellular link between UE 102 and node 104, via the WLAN link, e.g., between UE 102 and AP 106, may enable improved efficiency, bandwidth utilization, steering and/or offloading of traffic between UE 102 and node 104, e.g., as described below.

In some demonstrative embodiments, UE 102, node 104, and/or AP 106 may be configured to implement a protocol stack, e.g., a User plane (U-plane) protocol stack including a tunneling protocol layer configured to enable tunneling one or more DRBs via one or more WLAN links, e.g., as described below.

Figure 2:
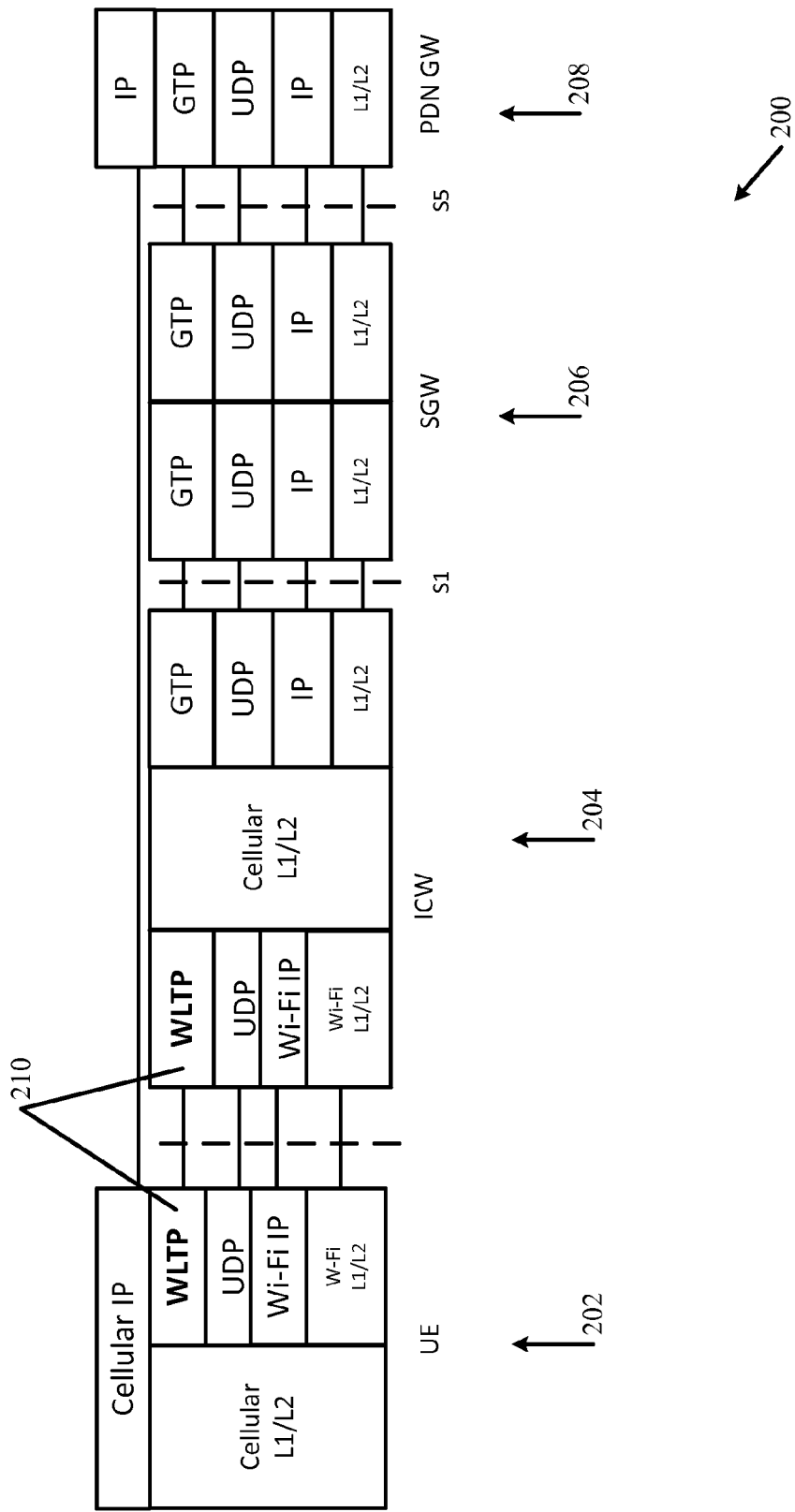
FIG. 2 is a schematic illustration of a user-plane protocol stack, in accordance with some demonstrative embodiments.

Reference is made to FIG. 2, which schematically illustrates a user-plane protocol stack 200, in accordance with some demonstrative embodiments. In some demonstrative embodiments, protocol stack 200 may be implemented by a UE, e.g., UE 102 (FIG. 1), an AP, e.g., AP 106 (FIG. 1), and/or a node, e.g. node 104 (FIG. 1), to tunnel one or more DRBs via one or more WLAN links.

As shown in FIG. 2, in some demonstrative embodiments protocol stack 200 may be implemented by an ICW small-cell 204 to communicate traffic between a UE 202 and a CN, e.g., including a SGW 206 and a PDN GW 208. However, in other embodiments, protocol stack 200 may be implemented by any other ode and/or AP of any other Rat and/or cell architecture, e.g., which may be integrated, co-located, or distributed between multiple devices and/or locations.

As shown in FIG. 2, protocol stack 200 may include a cellular link layer of a cellular link between UE 202 and ICW 204. For example, protocol stack 200 may include a cellular layer 1 (L1), e.g., a cellular Physical (PHY) layer, and a cellular data link Layer 2 (L2), e.g., a cellular Media Access Control (MAC) layer.

As shown in FIG. 2, protocol stack 200 may include a WLAN link layer of a WLAN link between UE 202 and ICW 204. For example, protocol stack 200 may include a WLAN layer 1, e.g., a WiFi layer 1 (L1), e.g., a WLAN PHY layer, and a WLAN data link Layer 2 (L2), e.g., a WLAN MAC layer.

As shown in FIG. 2, protocol stack 200 may include a WLAN Internet layer, e.g., a WLAN Internet Protocol (IP) layer, which may be above the WLAN link layer.

As shown in FIG. 2, protocol stack 200 may include a transport layer above the WLAN Internet layer. For example, protocol stack may include a User Datagram Protocol (UDP) above the WLAN IP layer.

As shown in FIG. 2, in some demonstrative embodiments, protocol stack 200 may include a WLAN Tunnel Protocol (WLTP) layer 210 above the transport layer. WLTP layer 210 may be configured to manage tunneling of DRBs via the WLAN link between UE 202 and ICW 204, e.g., as described below.

In some demonstrative embodiments, WLTP layer 210 may implement a tunneling header, which may be appended to packets communicated via the UDP, e.g., as described below.

In some demonstrative embodiments, communications between UE 202 and ICW 204 over WLTP layer 210 may be performed according to a WLTP.

In some demonstrative embodiments, the WLTP may be configured to establish a UDP tunneling connection between UE 202 and ICW 204 via the WLAN link, e.g., as described below.

In some demonstrative embodiments, the WLTP may be configured to manage, negotiate and/or coordinate moving, transferring and/or offloading one or more DRBs from the cellular link to the WLAN link, e.g., as described above.

In some demonstrative embodiments, the WLTP may be configured to manage, negotiate and/or coordinate moving, transferring and/or offloading one or more DRBs from the WLAN link back to the cellular link, e.g., as described above.

Referring back to FIG. 1, in some demonstrative embodiments UE 102, node 104 and AP 106 may be configured to use UDP tunneling to move and/or transport traffic from the cellular link to the WLAN link, and/or to support simultaneous WLAN and cellular connection and bearer mobility, e.g., as described below.

In some demonstrative embodiments, UE 102 and node 104 may be configured to establish one or more UDP tunneling connections 139 (also referred to as "offloading tunnels") between UE 102 and node 104 via the WLAN link between UE 102 and AP 106, e.g., as described below.

In some demonstrative embodiments, the one or more UDP tunneling connections 139 may be configured to differentiate between traffic of a plurality of DRBs between UE 102 and node 104, e.g., as described below.

In some demonstrative embodiments, tunneling the traffic of the plurality of DRBs via the UDP connections 139 in a manner, which may enable differentiating between the traffic of the plurality of DRBs, may enable implementing QoS techniques with respect to the traffic of EPS bearers including the plurality of DRBs.

In some demonstrative embodiments, UE 102 and node 104 may establish a plurality of UDP tunneling connections 139 configured to communicate traffic of respective ones of the plurality of DRBs, e.g., as described below.

In some demonstrative embodiments, different UDP port numbers may be assigned to the UDP connections 139, for example, to identify and/or differentiate between different DRBs. For example, the plurality of UDP connections 139 may be assigned to a respective plurality of different UDP ports at UE 102, e.g., as described below.

In some demonstrative embodiments, node 104 may establish with UE 102 a separate UDP tunnel connection 139 via the WLAN link between UE 102 and AP 106 for each active EPS Bearer, e.g., between UE 102 and CN 149.

In one example, UE 102 may have first and second PDN connections with CN 149 via node 104. For example, the first PDN connection may have two EPS bearers, and the second PDN connection may have one EPS bearer. According to this example, UE 102 may have two Cellular IP addresses for the two PDN connections, one Wi-Fi IP address for the WLAN link between UE 102 and AP 106. According to this example, UE 102 and node 104 may establish three UDP tunnels over the Wi-Fi link. The three UDP tunnels may be configured to separately tunnel traffic of three respective DRBs, including the two DRBs of the two EPS bearers of the first PDN connection and a DRB of the EPS bearer of the second PDN connection.

In some demonstrative embodiments, a UDP tunnel connection 139, e.g., each of UDP tunnel connections 139, may be assigned to a different UDP port at UE 102, e.g., to enable differentiating between the UDP tunnel connections 139.

In some demonstrative embodiments, a UDP tunnel connection 139, e.g., each of UDP connections 139, may be assigned to a different UDP port at node 104, e.g., to enable differentiating between the UDP tunnel connections 139.

In some demonstrative embodiments, using the plurality of separate UDP connections 139 may enable differentiating between the traffic flows of UE 102, e.g., according QoS requirements of the different EPS bearers, e.g., as described below.

In some demonstrative embodiments, the QoS requirements of an EPS bearer between UE 102 and CN 149 may be provided to the WLAN link between UE 102 and AP 106, for example, using an IP header of the UDP flow carrying the traffic of the EPS bearer. For example, the QoS requirements of the EPS bearer may be provided to the WLAN link by marking a Differentiated Service Code Point (DSCP) field, or any other field, of the IP header for the corresponding UDP flow.

In one example, three UDP tunnels 139 may be established to tunnel the traffic of the three DRBs between UE 102 and node 104 via the WLAN link between UE 102 and AP 106, e.g., as follows:

TABLE 1

| APN | DRB ID | QCI | UDP Port @UE | UDP Port @ICW or @eNB | DSCP | 802.11e Traffic Class |
|---|---|---|---|---|---|---|
| Internet | 1 | 9 (web browsing) | 1002 | 9000 | 8 (CS1) | AC_BE (Best Effort) |
|  | 2 | 4 (video streaming) | 1003 | 8000 | 30 (AF33) | AC_VI (Video) |
| IMS | 3 | 1 (VoIP) | 1004 | 7000 | 46 (EF) | AC_VO (Voice) |

According to this example, the first PDN connection may be with a first PGW associated with a first Access Point Name (APN), e.g., to communicate with the Internet, and the second PDN connection may be with a second PGW associated with a second APN, e.g., to communicate with an IP Multimedia Core Network Subsystem (IMS) network.

According to this example, a first EPS bearer of the first PDN connection ("EPS bearer 1") may have a DRB ID of "1", a second EPS bearer of the first PDN connection ("EPS bearer 2") may have a DRB ID of "2", and the single EPS bearer of the second PDN connection (EPS bearer 3") may have a DRB ID of "3".

In some demonstrative embodiments, each EPS bearer may be mapped to a QoS Class Identifier (QCI), e.g., according to a level of service required by an application utilizing the EPS bearer. For example, according to Table 1, the DRB 1 may be mapped to a QCI 9, e.g., if the EPS bearer 1 is to be used by a web browsing application; the DRB2 may be mapped to a QCI 4, e.g., if the EPS bearer 2 is to be used by a video streaming application; and/or the DRB 3 may be mapped to a QCI 1, e.g., if the EPS bearer 3 is to be used by a Voice over IP (VoIP) application.

In some demonstrative embodiments, controller 145 may assign three UDP ports at UE 102 to the three UDP tunnels, respectively. For example, according to Table 1, the DRB 1 may be assigned to a UDP port 1002 at UE 102, the DRB 2 may be assigned to a UDP port 1003 at UE 102, and the DRB 3 may be assigned to a UDP port 1004 at UE 102.

In some demonstrative embodiments, controller 144 may assign three UDP ports at node 104 to the three DRBs of UE 102, respectively. For example, DRB 1, DRB 2, and DRB 3 may be assigned to UDP ports 9000, 8000, and 7000, respectively, at node (eNB) 104.

In some demonstrative embodiments, each EPS bearer may have a QoS requirement, which may be mapped to a traffic class. For example, according to Table 1, the EPS bearer 1 may be mapped to a traffic class of Best Effort (AC_BE), the EPS bearer 2 may be mapped to a traffic class of Video (AC_VI), and the EPS bearer 3 may be mapped to a traffic class of Voice (AC_VO).

In some demonstrative embodiments, the QoS requirement of an EPS bearer may be identified in a DSCP field of an IP header of packets communicated over the UDP tunnel corresponding to the EPS bearer. For example, traffic of the EPS bearer 1 may be tunneled in packets communicated via a first UDP connection between UDP port 1002 of UE 102 and UDP port 9000 of node 104; traffic of the EPS bearer 2 may be tunneled in packets communicated via a second UDP connection between UDP port 1003 of UE 102 and UDP port 9000 of node 104; and/or traffic of the EPS bearer 3 may be tunneled in packets communicated via a third UDP connection between UDP port 1004 of UE 102 and UDP port 8000 of node 104. According to Table 1, the packets communicated via the first UDP connection may include a DSCP field including the code point 8 (DSCP alias CS1); the packets communicated via the second UDP connection may include a DSCP field including the code point 30 (DSCP alias AF33); and/or the packets communicated via the third UDP connection may include a DSCP field including the code point 46 (DSCP alias EF).

In some demonstrative embodiments, the one or more UDP tunneling connections may be configured in any other manner to differentiate between the traffic of the different DRBs, e.g., as described below.

In some demonstrative embodiments, a UDP connection may be configured to communicate traffic of two or more DRBs in a manner, which may enable differentiating between the traffic of the two or more DRBs. For example, in some demonstrative embodiments, UE a102 and node 104 may establish at least one UDP tunneling connection configured to communicate traffic of two or more DRBs.

In one example, a single UDP tunneling connection may be established for UE 102 to communicate the traffic of all DRBs between UE and node 104.

In some demonstrative embodiments, a control header may be added to a UDP payload communicated over the UDP tunneling connection. The control header may be configured to identify the EPS bearer to which the traffic of the UDP payload belongs. For example, the control header may include an identifier, e.g., a DRB ID, to identify an EPS bearer of two or more EPS bearers being tunneled by the UDP connection.

In some demonstrative embodiments, node 104 may send to UE 102 configuration information to configure the one or more UDP connections. For example, the configuration information may include information to enable UE 102 to establish a WLAN link with AP, 106 and to configure a UDP connection via the WLAN link, e.g., as described below.

In some demonstrative embodiments, the configuration information may include an address of AP 106, and UDP information of a UDP server at node 104, e.g., as described below.

In some demonstrative embodiments, the configuration information may include the address of AP 106 in the form of a Basis Service Set Identifier (BSSID), or a Service Set Identifier (SSID), of the WLAN controlled by AP 106, or any other identifier to identify the WLAN controlled by AP.

In some demonstrative embodiments, the UDP information may include, for example, an IP address of the UDP server at node 104, and at least one UDP port number of the UDP server.

In some demonstrative embodiments, node 104 may transmit the configuration information to UE 102 via the cellular link between node 104 and UE 102.

In some demonstrative embodiments, node 104 may transmit the configuration information to UE 102 as part of a Radio Resource Control (RRC) message, for example, an RRC reconfiguration message, e.g., as described below.

In one example, radio 142 may transmit to UE 102 a RRC Reconfiguration message including a Wi-Fi AP BSSID of AP 106, an IP address of the UDP server at node 130, and a UDP port number of the UDP server at node 104.

In some demonstrative embodiments, controller 145 may configure the one or more UDP connections based on the configuration information received from node 104, e.g., as described below.

In some demonstrative embodiments, controller 145 may connect to AP 106 to establish the WLAN link with AP 106, e.g., according to the BSSID provided by node 104.

In some demonstrative embodiments, controller 145 may use the UDP information to establish one or more UDP connections with the UDP server of node 104 via the WLAN link, e.g., as described below.

In some demonstrative embodiments, controller 145 may establish a plurality of UDP connections using the IP address of the UDP server and the UDP port number.

In some demonstrative embodiments, controller 145 may establish each UDP connection to tunnel traffic of a different DRB. For example, controller 145 may assign a different UDP port at UE 102 to each DRB, e.g., as described above with reference to Table 1.

In some demonstrative embodiments, UE 102 may transmit to node 104 mapping information to map the plurality of DRBs to the plurality of UDP ports. For example, the mapping information may include a DRB ID and a UDP port number at UE 102, which is assigned to the DRB, e.g., as described above with reference to Table 1.

In some demonstrative embodiments, UE 102 may transmit the mapping information as part of an RRC message, for example, an RRC configuration complete message, e.g., as described below.

In one example, radio 143 may transmit to node 104 a RRC reconfiguration complete message including, for example, the following information, for example, if UE 102 assigns a UDP tunnel per bearer ("Per-Bearer UDP Tunnel"):

Number of active DRBs
for a DRB:
DRB ID
the UDP port number (of the DRB) assigned at the UE In some demonstrative embodiments, controller 144 may configure a plurality of UDP connections to be assigned to one UDP port at UE 102, e.g., as described above. According to these embodiments, the configuration of the UDP tunneling connection may be performed at node 104, and controller 145 may not be required to map the DRBs to a plurality of UDP ports at UE 102.

In some demonstrative embodiments, UE 102 and/or node 104 may be configured to move one or more DRBs of the plurality of DRBs from the cellular link to the UDP tunnel, e.g., as described below.

In some demonstrative embodiments, UE 102 and node 104 may be configured coordinate a handover of the one or more DRBs to the UDP tunnel.

In some demonstrative embodiments, UE 102 and node 104 may be configured to negotiate and/or agree on a mobility decision to move a DRB from the cellular link to the WLAN link.

In some demonstrative embodiments, UE 102 and/or node 104 may be configured to move at least one DRB of the one or more DRBs back to the cellular link, for example, without negotiation and/or coordination, e.g., as described below.

In some demonstrative embodiments, UE 102 and/or node 104 may be configured to initiate a mobility decision to move a DRB from the WLAN link back to the cellular link.

In some demonstrative embodiments, controller 144 may be configured to select at least one DRB to be offloaded from the cellular link to the WLAN link via the UDP tunnel.

In some demonstrative embodiments, radio 142 may transmit to UE 102 a request message, e.g., a RRC request message, to handover the DRB. The request message may include, for example, an identifier of the DRB to be offloaded to the WLAN link via the UDP tunnel.

In one example, controller 144 may select a PDN connection to be offloaded. According to this example, the request message may include identifiers of all DRBs belonging to the PDN connection.

In one example, controller 144 may select to offload one or more DRBs of a PDN connection, e.g., while one or more other DRBs of the PDN connection are not to be offloaded. According to this example, the request message may include identifiers of the DRBs to be offloaded.

In some demonstrative embodiments, UE 102 may receive the request message, and controller 145 may determine whether to accept or reject the request to offload the one or more DRBs. In one example, controller 145 may select to accept the request to offload all DRBs included in the request message. In another example, controller 145 may select to reject the request to offload all DRBs included in the request message. In another example, controller 145 may select to accept the request to offload one or more DRBs included in the request message, and to reject the request to offload one or more other DRBs included in the request message.

In some demonstrative embodiments, UE 102 may transmit to node 104 a response message, e.g., a RRC response message, to indicate whether or not the request was accepted or rejected with respect to the DRBs.

In some demonstrative embodiments, controller 144 may be configured to define one or more conditions to trigger moving a DRB from the WLAN link back to the cellular link.

In some demonstrative embodiments, controller 144 may define one or more handover triggers, e.g., a list of handover triggers, to trigger WLAN to cellular handover of the DRBs. The triggers may relate to one or more parameters ("trigger parameters"), for example, a Received Signal Strength indicator, e.g., a minimal RSSI, throughput, e.g., a minimal throughput, a packet loss rate, e.g., a maximal packet loss rate, a delay variation, e.g., a maximal delay variation, and/or any other parameter to trigger the offloading from the WLAN link back to the cellular link.

In some demonstrative embodiments, radio 142 may transmit to UE 102 a message including trigger information corresponding to the one or more conditions.

In some demonstrative embodiments, radio 143 may receive the message including the trigger information, and controller 145 may measure the one or more trigger parameters, and may select whether or not to trigger the handover of a DRB from the WLAN link back to the cellular link based on the measured trigger parameters.

In one example, radio 142 may transmit to UE 102 a RRC Reconfiguration message to request moving a PDN connection, or an EPS Bearer from the cellular link to the WLAN link. The RRC Reconfiguration message may include, for example, a number of the DRBs to be offloaded to the WLAN link. For example, for each DRB to be offloaded to the WLAN link, the message may include a DRB ID, and one or more WLAN to Cellular handover triggers.

According to this example, UE 102 may send to node 104 a RRC Reconfiguration Complete message to accept or reject the request to offload the one or more DRBs to the WLAN link. The RRC Reconfiguration Complete message may also include information to confirm which PDN connection or DRB is to be offloaded to the WLAN link. For example, the RRC Reconfiguration Complete message may include a number of the DRBs to be offloaded to the WLAN Link. For example, for each DRB to be offloaded to the WLAN link, the RRC Reconfiguration Complete message may include the DRB ID.

In some demonstrative embodiments, the selection of one or more DRBs to be moved from the cellular link to the WLAN link may be performed at UE 102, e.g., as described below.

In some demonstrative embodiments, controller 145 may select one or more DRBs to be handed over from the cellular link to the UDP tunnel. For example, radio 143 may transmit to node 140 a request message, e.g., an RRC request message, to request moving one or more DRBs from the cellular link to the WLAN link.

In some demonstrative embodiments, node 104 may receive the request message, and controller 144 may determine whether to accept or reject the request to offload the one or more DRBs. In one example, controller 144 may select to accept the request to offload all DRBs included in the request message. In another example, controller 144 may select to reject the request to offload all DRBs included in the request message. In another example, controller 144 may select to accept the request to offload one or more DRBs included in the request message, and to reject the request to offload one or more other DRBs included in the request message.

In some demonstrative embodiments, node 104 may transmit to UE 102 a response message, e.g., a RRC response message, to indicate whether or not the request was accepted or rejected with respect to the DRBs.

In one example, UE 102 may send to node 104 a request message to request moving a DRB from the cellular link to the WLAN link. The request message may include, for example, a number of the DRBs to be offloaded to the WLAN Link. For example, for each DRB to be offloaded to the WLAN link, the request message may include the DRB ID.

According to this example, node 104 may send to UE 102 a response message to accept or reject the request. The response message may include, for example, a number of the DRBs to be offloaded to the WLAN link. For example, for each DRB to be offloaded to the WLAN link, the response message may include the DRB ID, and one or more WLAN to cellular handover triggers, e.g., the triggers described above.

In some demonstrative embodiments, handover of a DRB from the WLAN link back to the cellular link may be triggered by UE 102 or by node 104.

In some demonstrative embodiments, node 104 may select to move a DRB from the WLAN link back to the cellular link. For example, radio 142 may to transmit to UE 102 a command to move the DRB back to the cellular link.

In some demonstrative embodiments, one of UE 102 and node 104 ("the initiating device") may initiate the handover of one or more DRBs from the WLAN link back to the cellular link. The initiating device may send, for example, a mobility command message to provide information regarding the one or more DRBs to be handed off to the cellular link. In one example, the mobility command message may include a number of the DRBs to be offloaded to the cellular link. The mobility command message may also include, for example, a DRB ID of DRB to be moved back to the cellular link.

In some demonstrative embodiments, UE 102 may move one or more DRBs back to the cellular link by starting to send uplink packets of a DRB over the cellular link. This operation may implicitly indicate to node 104 that UE 102 has decided to move the DRB back to the cellular link.

In some demonstrative embodiments, node 104 may move one or more DRBs back to the cellular link by starting to send downlink packets of a DRB over the cellular link. This operation may implicitly indicate to UE 102 that node 104 has decided to move the DRB back to the cellular link.

Figure 3:
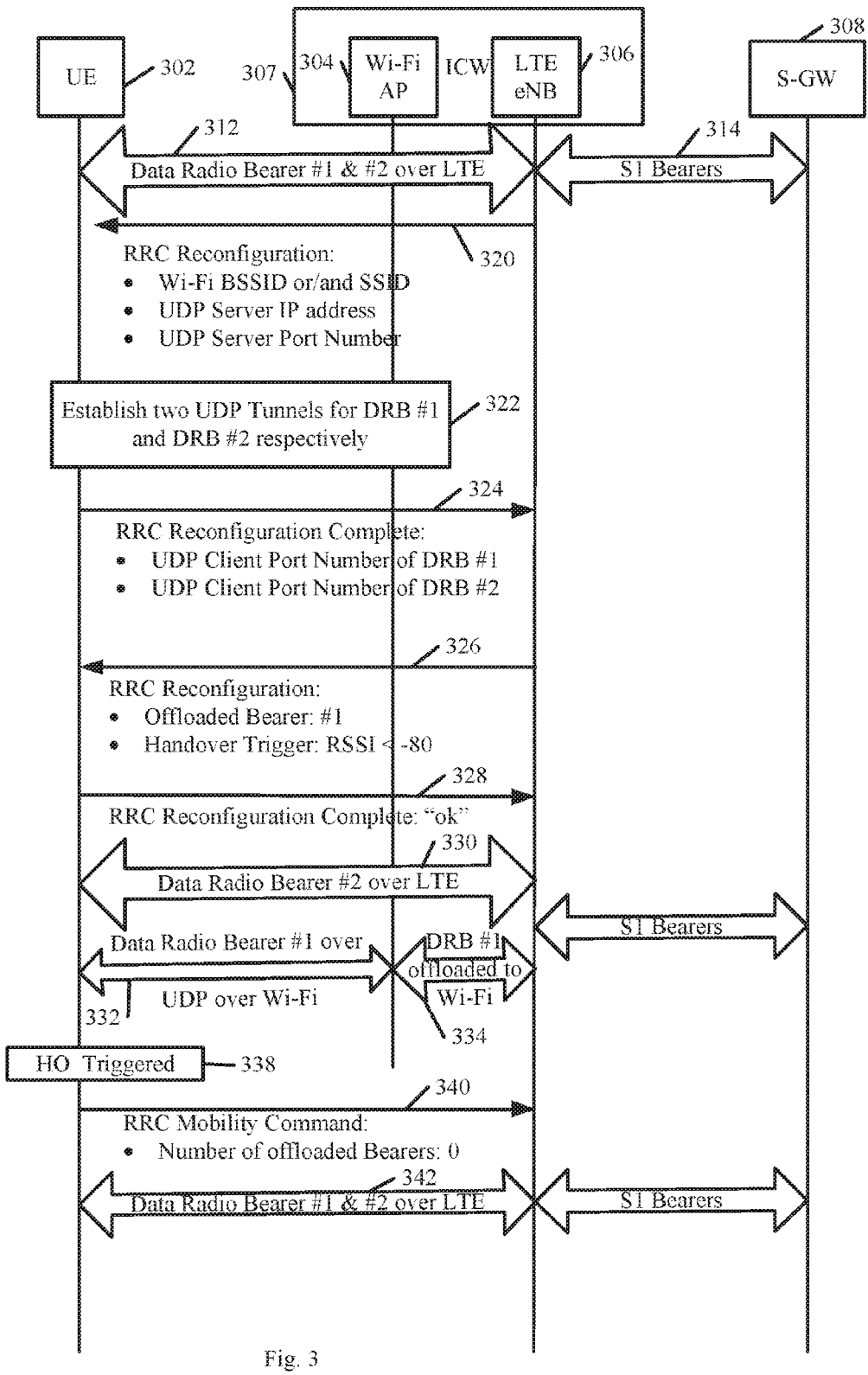
FIG. 3 is a schematic illustration of a sequence diagram of operations performed by a User Equipment (UE), a Wireless Local Area Network (WLAN) Access Point (AP), a Node, and a Core Network (CN), in accordance with some demonstrative embodiments.

Reference is made to FIG. 3, which schematically illustrates a sequence diagram of operations performed by a UE 302, a WLAN AP 304, a Node 306, and a S-GW 308 of a CN, in accordance with some demonstrative embodiments. In some demonstrative embodiments, UE 302 may perform the functionality of UE 102 (FIG. 1), AP 304 may perform the functionality of AP 106 (FIG. 1), node 306 may perform the functionality of node 104 (FIG. 1), and/or S-GW 308 may perform the functionality of a S-GW in CN 149 (FIG. 1).

In some demonstrative embodiments, one or more operations of FIG. 3 may be performed as part of a WLTP over a WLTP layer, e.g., WLTP layer 210 (FIG. 2).

In some demonstrative embodiments, AP 304 and node 306 may be implemented as part of an ICW 307, e.g., as described above. In other embodiments, AP 304 and node 306 may be implemented as separate and/or independent devices.

In some demonstrative embodiments, UE 302 and node 306 may communicate two DRBS 312, e.g., including a first DRB (DRB #1) and a second DRB (DRB #2), over a cellular link between UE 302 and node 306. Node 306 may communicate with S-GW 308 traffic of the DRBs 312, e.g., via S1 bearers 314.

In some demonstrative embodiments, node 306 may transmit to UE 302 a RRC reconfiguration message 320 via the cellular link. For example, RRC reconfiguration message 320 may include a WLAN BSSID of AP 304, and a port number of a UDP server of node 306, e.g., as described above.

In some demonstrative embodiments, UE 302 may establish (322) two UDP tunnels for the two DRBs 312, respectively. For example, UE 302 may establish a WLAN link with AP 304, and UE 302 may assign a first UDP client port at UE 302 to DRB #1, and a second UDP client port at UE 302 to DRB #2, e.g., as described above.

In some demonstrative embodiments, UE 302 may transmit to node 306 a RRC reconfiguration complete message 324 via the cellular link. For example, RRC reconfiguration complete message 324 may include the first UDP Client port number assigned to DRB#1, and the second UDP Client port number assigned to DRB#2.

In some demonstrative embodiments, node 306 may select to move traffic of DRB#1 from the cellular link to the WLAN link between UE 302 and AP 304. For example, node 306 may send to UE 302 a RRC reconfiguration message 326 via the cellular link. For example, RRC reconfiguration message 326 may include a request to offload DRB#1 to the WLAN link, and a handover trigger to trigger handover of DRB#1 back to the cellular link, e.g., when a measured RSSI over the WLAN link is less than (−80).

In some demonstrative embodiments, UE 302 may select to accept the request to move DRB#1 to the WLAN link. For example, UE 302 may transmit to node 306 a RRC reconfiguration complete message 328 via the cellular link. For example, RRC reconfiguration complete message 328 may include an acknowledgement of the request to move DRB#1 To the WLAN link.

In some demonstrative embodiments, UE 302 and node 306 may move the traffic of DRB#1 to the WLAN link, for example, while the traffic of the DRB#2 may continue to be communicated (330) over the cellular link. For example, UE 302 may communicate (332) the traffic of DRB#1 via the WLAN link with AP 304, and AP 304 may communicate (334) the traffic of DRB#1 with node 306.

In some demonstrative embodiments, at some point in time, UE 302 may determine that handover back to the cellular link is to be triggered (338). For example, at some point of time, UE 302 may measure an RSSI less than (−80).

In some demonstrative embodiments, UE 302 may send a RRC mobility Command 340 to node 306 via the cellular link. For example, the RRC mobility Command 340 may include a number of DRBs to be offloaded back to the cellular link, e.g., one DRB, and an ID of DRB#1.

In some demonstrative embodiments, the DRB#1 may be moved back to the cellular link. Accordingly, both bearers DRB#1 and DRB#2 may be communicated (342) over the cellular link.

Figure 4:
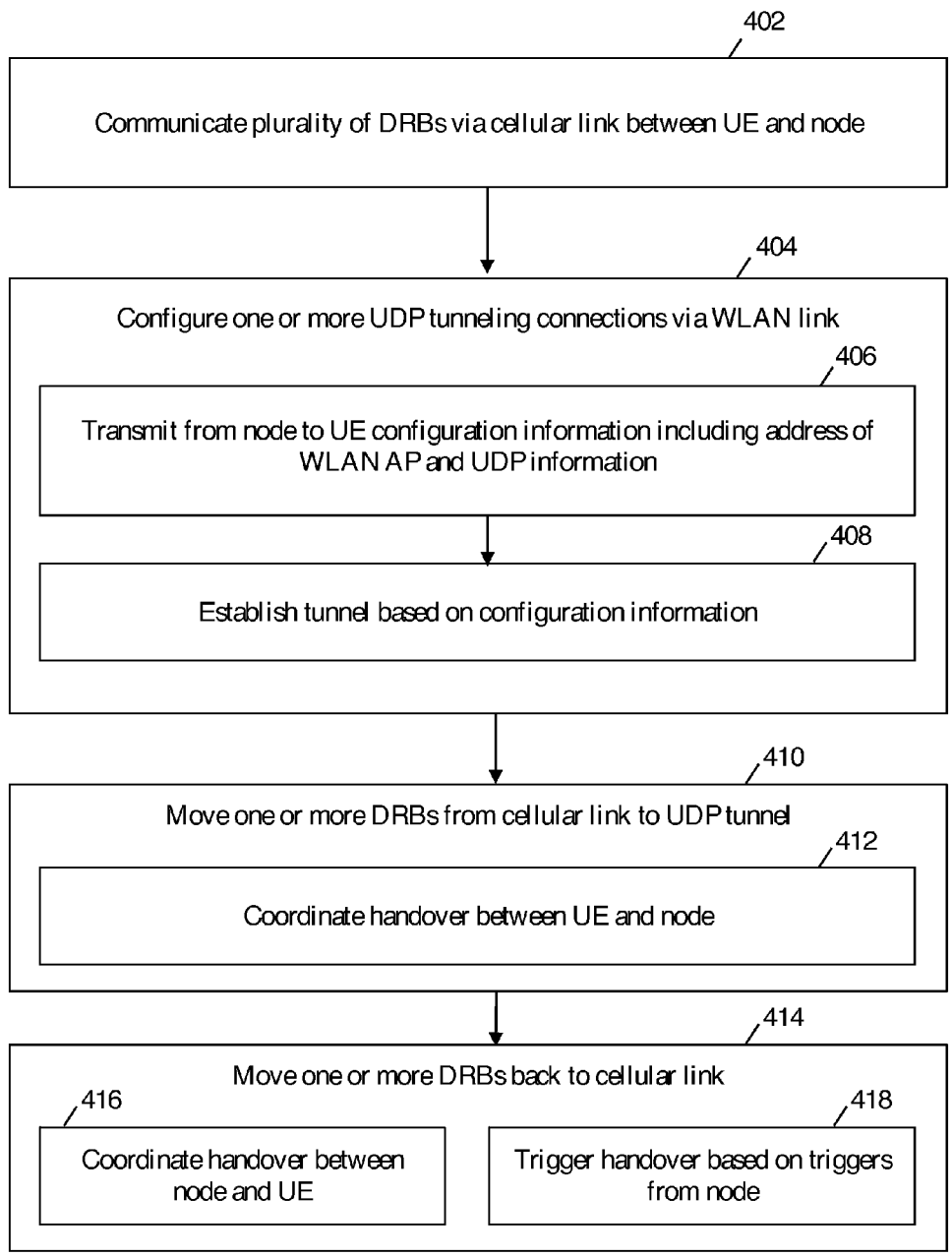
FIG. 4 is a schematic illustration of a method of tunneling Data Radio Bearers (DRBs) via a WLAN link, in accordance with some demonstrative embodiments.

FIG. 4 is a schematic illustration of a method of tunneling Data Radio Bearers (DRBs) via a WLAN link, in accordance with some demonstrative embodiments. In some embodiments, one or more of the operations of the method of FIG. 4 may be performed by a wireless communication system e.g., system 100 (FIG. 1); a wireless communication device, e.g., UE 102 (FIG. 1), node 104 (FIG. 1) and/or AP 106 (FIG. 1); and/or a wireless communication unit, e.g., wireless communication units 110 and/or 130 (FIG. 1).

As indicated at block 402, the method may include communicating between a UE and a node traffic of a plurality of DRBs via a cellular link between the node and the UE. For example, node 104 (FIG. 1) and UE 102 (FIG. 1) may communicate traffic of a plurality of DRBs via a cellular link between UE 102 (FIG. 1) and node 104 (FIG. 1), e.g., as described above.

As indicated at block 404, the method may include configuring one or more UDP tunneling connections between the UE and the node via a WLAN link between the UE and a WLAN AP. The one or more UDP tunneling connections may be configured to differentiate between traffic of the plurality of DRBs. For example, UE 102 (FIG. 1) and node 104 (FIG. 1) may configure one or more UDP tunneling connections between UE 120 (FIG. 1) and node 104 (FIG. 1) via a WLAN link between UE 102 (FIG. 1) and WLAN AP 106 (FIG. 1), e.g., as described above.

As indicated at block 406, the method may include transmitting from the node to the UE configuration information including an address of the WLAN AP, and UDP information of a UDP server at the node. For example, radio 142 (FIG. 1) may transmit to radio 143 (FIG. 1) a RRC message including the BSSID of AP 106 (FIG. 1), and UDP information of the UDP server at node 104 (FIG. 1), e.g., as described above.

As indicated at block 408, the method may include establishing a tunnel including the one or more UDP tunneling connections based on the configuration information. For example, controller 145 (FIG. 1) may establish one or more UDP tunneling connections with node 104 (FIG. 1) based on the configuration information, e.g., as described above.

As indicated at block 410, the method may include moving one or more DRBs of from the cellular link to the UDP tunnel. For example, node 104 (FIG. 1) may move a DRB to the WLAN link, and/or UE 102 (FIG. 1) may move a DRB to the WLAN link, e.g., as described above.

As indicated at block 412, the method may include coordinating between the UE and the node the handover of the DRB to the WLAN link. For example, UE 102 (FIG. 1) and node 104 (FIG. 1) may coordinate the handover of the DRB from the cellular link to the WLAN link, e.g., as described above.

As indicated at block 414, the method may include moving one or more DRBs of from the UDP tunnel over the WLAN link back to the cellular link. For example, node 104 (FIG. 1) may move a DRB back to the cellular link, and/or UE 102 (FIG. 1) may move a DRB back to the cellular link, e.g., as described above.

As indicated at block 416, the method may include coordinating between the UE and the node the handover of the DRB back to the cellular link. For example, UE 102 (FIG. 1) and node 104 (FIG. 1) may coordinate the handover of the DRB from the UDP tunnel over the WLAN link back to the cellular link, e.g., as described above.

As indicated at block 418, the method may include triggering the handover of a DRB from the UDP tunnel over the WLAN link back to the cellular link, based on one or more triggers defined by the node. For example, UE may trigger the handover of a DRB from the UDP tunnel over the WLAN link back to the cellular link, based on one or more triggers defined by node 104 (FIG. 1), for example, when coordinating the handover of the DRB from the cellular link to the UDP tunnel, e.g., as described above.

Figure 5:
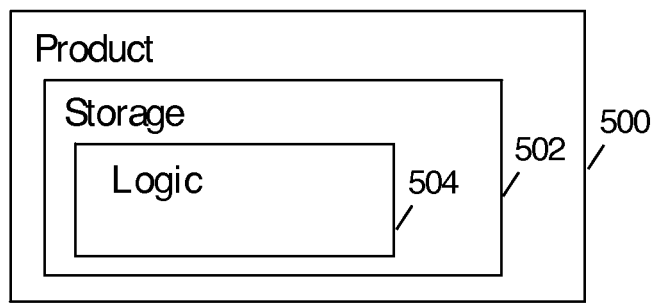
FIG. 5 is a schematic illustration of a product, in accordance with some demonstrative embodiments.

FIG. 5 is a schematic illustration of a product of manufacture, in accordance with some demonstrative embodiments. Product 500 may include a non-transitory machine-readable storage medium 502 to store logic 504, which may be used, for example, to perform at least part of the functionality of UE 102 (FIG. 1), node 104 (FIG. 1), AP 106 (FIG. 1), wireless communication unit 110 (FIG. 1), wireless communication unit 130 (FIG. 1), controller 144 (FIG. 1), and/or controller 145 (FIG. 1), and/or to perform one or more operations of the method of FIG. 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a User Equipment (UE) comprising a radio to receive configuration information from an evolved Node B (eNB), the configuration information including an address of a Wireless Local Area Network (WLAN) Access Point (AP), and User Datagram Protocol (UDP) information of a UDP server at the eNB; and a controller to establish one or more UDP tunneling connections between the UE and the eNB via the WLAN based on the configuration information, the one or more UDP tunneling connections being configured to differentiate between traffic of a plurality of Data Radio Bearers (DRBs).

Example 2 includes the subject matter of Example 1, and optionally, wherein the radio is to receive from the eNB offloading information corresponding to a DRB of the plurality of DRBs, the offloading information including an identifier of the DRB, and wherein the controller is to move the DRB from a cellular link between the UE and the eNB to a UDP tunneling connection corresponding to the DRB.

Example 3 includes the subject matter of Example 2, and optionally, wherein the radio is to send to the eNB a request to offload the DRB, and to receive the offloading information in response to the request to offload the DRB.

Example 4 includes the subject matter of Example 2, and optionally, wherein the radio is to receive the offloading information as part of a request to offload the DRB, the controller is to determine whether to accept or reject the request to offload the DRB, and the radio is to transmit to the eNB a response to indicate whether the request to offload the DRB is accepted or rejected.

Example 5 includes the subject matter of any one of Examples 2-4, and optionally, wherein the offloading information includes triggering information defining one or more trigger conditions, and wherein the controller is to move the DRB from the UDP tunneling connection back to the cellular link based on the trigger conditions.

Example 6 includes the subject matter of any one of Examples 2-5, and optionally, wherein the radio is to receive from the eNB a command to move the DRB back to the cellular link, and wherein the controller is to move the DRB back to the cellular link.

Example 7 includes the subject matter of any one of Examples 1-6, and optionally, wherein the controller is to establish a plurality of UDP tunneling connections configured to communicate traffic of respective ones of the plurality of DRBs.

Example 8 includes the subject matter of Example 7, and optionally, wherein the controller is to assign to the plurality of UDP connections a respective plurality of different UDP ports at the UE.

Example 9 includes the subject matter of Example 8, and optionally, wherein the radio is to transmit mapping information to the eNB, the mapping information mapping the plurality of DRBs to the plurality of UDP ports.

Example 10 includes the subject matter of any one of Examples 1-6, and optionally, wherein the controller is to establish at least one UDP tunneling connection to communicate traffic of two or more DRBs, the controller to assign a control header to a UDP payload communicated over the UDP tunneling connection, the UDP payload including an identifier to identify a DRB of the two or more DRBs.

Example 11 includes the subject matter of any one of Examples 1-10, and optionally, wherein the UDP information includes an Internet Protocol (IP) address of the UDP server, and at least one UDP port number of the UDP server.

Example 12 includes the subject matter of any one of Examples 1-11, and optionally, wherein the radio is to receive from the eNB a Radio Resource Control (RRC) message including the configuration information.

Example 13 includes the subject matter of any one of Examples 1-12, and optionally, wherein the plurality of DRBs corresponds to a plurality of Evolved Packet switched System (EPS) bearers.

Example 14 includes the subject matter of any one of Examples 1-13, and optionally, comprising one or more antennas; a processor; a memory; an input unit; and an output unit.

Example 15 includes an evolved Node B (eNB) comprising a radio to communicate with a User Equipment (UE) traffic of a plurality of Data Radio Bearers (DRBs) via a cellular link; and a controller to establish an offloading tunnel between the UE and the eNB to tunnel the DRBs via a Wireless Local Area Network (WLAN) link, the offloading tunnel including one or more User Datagram Protocol (UDP) tunneling connections configured to differentiate between the plurality of DRBs, wherein the controller is to coordinate with the UE a handover of at least one DRB of the plurality of DRBs to the offloading tunnel.

Example 16 includes the subject matter of Example 15, and optionally, wherein the controller is to select the DRB, and the radio is to transmit to the UE a Radio Resource Control (RRC) request message to handover the DRB, and to receive from the UE a RRC response message in response to the RRC request message, the RRC request message including an identifier of the DRB.

Example 17 includes the subject matter of Example 15, and optionally, wherein the radio is to receive from the UE a Radio Resource Control (RRC) request message to handover the DRB, and to transmit to the UE a RRC response message in response to the RRC request message, the RRC response message to acknowledge or reject the handover of the DRB.

Example 18 includes the subject matter of any one of Examples 15-17, and optionally, wherein the controller is to define one or more conditions to trigger moving the DRB back to the cellular link, and the radio is to transmit to the UE a message including trigger information corresponding to the one or more conditions.

Example 19 includes the subject matter of any one of Examples 15-17, and optionally, wherein the radio is to transmit to the UE a command to move the DRB back to the cellular link.

Example 20 includes the subject matter of any one of Examples 15-19, and optionally, wherein the offloading tunnel comprises a plurality of UDP tunneling connections configured to communicate traffic of respective ones of the plurality of DRBs.

Example 21 includes the subject matter of Example 20, and optionally, wherein the radio is to receive from the UE mapping information to map the plurality of DRBs to a plurality of UDP ports at the UE.

Example 22 includes the subject matter of any one of Examples 15-19, and optionally, wherein the offloading tunnel comprises at least one UDP tunneling connection to communicate traffic of two or more DRBs, the controller to identify a DRB of the two or more DRBs based on a header of a UDP payload communicated over the UDP tunneling connection.

Example 23 includes the subject matter of any one of Examples 15-22, and optionally, wherein the radio is to transmit configuration information to the UE, the configuration information including an address of a WLAN Access Point (AP), and UDP information of a UDP server at the eNB.

Example 24 includes the subject matter of Example 23, and optionally, wherein the UDP information includes an Internet Protocol (IP) address of the UDP server, and at least one UDP port number of the UDP server.

Example 25 includes the subject matter of any one of Examples 15-24, and optionally, wherein the plurality of DRBs corresponds to a plurality of Evolved Packet switched System (EPS) bearers.

Example 26 includes the subject matter of any one of Examples 15-25, and optionally, comprising one or more antennas; a processor; and a memory.

Example 27 includes a method performed at a User Equipment (UE), the method comprising receiving configuration information from an evolved Node B (eNB), the configuration information including an address of a Wireless Local Area Network (WLAN) Access Point (AP), and User Datagram Protocol (UDP) information of a UDP server at the eNB; establishing a tunnel including one or more UDP tunneling connections between the UE and the eNB via the WLAN based on the configuration information, the one or more UDP tunneling connections being configured to differentiate between traffic of a plurality of Data Radio Bearers (DRBs); moving one or more DRBs of the plurality of DRBs from a cellular link to the tunnel; and moving at least one DRB of the one or more DRBs back to the cellular link.

Example 28 includes the subject matter of Example 27, and optionally, comprising receiving from the eNB offloading information corresponding to the one or more DRBs, the offloading information including identifiers of the one or more DRBs.

Example 29 includes the subject matter of Example 28, and optionally, comprising sending to the eNB a request to offload the one or more DRBs, and receiving the offloading information in response to the request to offload the one or more DRBs.

Example 30 includes the subject matter of Example 28, and optionally, comprising receiving the offloading information as part of a request to offload the one or more DRBs; determining whether to accept or reject the request to offload the one or more DRBs; and transmitting to the eNB a response to indicate whether the request to offload the one or more DRBs is accepted or rejected.

Example 31 includes the subject matter of any one of Examples 28-30, and optionally, wherein the offloading information includes triggering information defining one or more trigger conditions, and wherein moving the DRB back to the cellular link comprises moving the DRB back to the cellular link based on the trigger conditions.

Example 32 includes the subject matter of any one of Examples 28-31, and optionally, comprising receiving from the eNB a command to move the DRB back to the cellular link.

Example 33 includes the subject matter of any one of Examples 27-32, and optionally, wherein establishing the tunnel comprises establishing a plurality of UDP tunneling connections configured to communicate traffic of respective ones of the plurality of DRBs.

Example 34 includes the subject matter of Example 33, and optionally, comprising assigning to the plurality of UDP connections a respective plurality of different UDP ports at the UE.

Example 35 includes the subject matter of Example 34, and optionally, comprising transmitting mapping information to the eNB, the mapping information mapping the plurality of DRBs to the plurality of UDP ports.

Example 36 includes the subject matter of any one of Examples 27-32, and optionally, wherein establishing the tunnel comprises establishing at least one UDP tunneling connection to communicate traffic of two or more DRBs, the method comprises assigning a control header to a UDP payload communicated over the UDP tunneling connection, the UDP payload including an identifier to identify a DRB of the two or more DRBs.

Example 37 includes the subject matter of any one of Examples 27-36, and optionally, wherein the UDP information includes an Internet Protocol (IP) address of the UDP server, and at least one UDP port number of the UDP server.

Example 38 includes the subject matter of any one of Examples 27-37, and optionally, comprising receiving from the eNB a Radio Resource Control (RRC) message including the configuration information.

Example 39 includes the subject matter of any one of Examples 27-38, and optionally, wherein the plurality of DRBs corresponds to a plurality of Evolved Packet switched System (EPS) bearers.

Example 40 includes a method performed at an evolved Node B (eNB), the method comprising communicating with a User Equipment (UE) traffic of a plurality of Data Radio Bearers (DRBs) via a cellular link; establishing an offloading tunnel between the UE and the eNB to tunnel the DRBs via a Wireless Local Area Network (WLAN) link, the offloading tunnel including one or more User Datagram Protocol (UDP) tunneling connections configured to differentiate between the plurality of DRBs; and coordinating with the UE a handover of at least one DRB of the plurality of DRBs to the offloading tunnel.

Example 41 includes the subject matter of Example 40, and optionally, comprising selecting the DRB, transmitting to the UE a Radio Resource Control (RRC) request message to handover the DRB, and receiving from the UE a RRC response message in response to the RRC request message, the RRC request message including an identifier of the DRB.

Example 42 includes the subject matter of Example 40, and optionally, comprising receiving from the UE a Radio Resource Control (RRC) request message to handover the DRB, and transmitting to the UE a RRC response message in response to the RRC request message, the RRC response message to acknowledge or reject the handover of the DRB.

Example 43 includes the subject matter of any one of Examples 40-42, and optionally, comprising defining one or more conditions to trigger moving the DRB back to the cellular link, and transmitting to the UE a message including trigger information corresponding to the one or more conditions.

Example 44 includes the subject matter of any one of Examples 40-42, and optionally, comprising transmitting to the UE a command to move the DRB back to the cellular link.

Example 45 includes the subject matter of any one of Examples 40-44, and optionally, wherein the offloading tunnel comprises a plurality of UDP tunneling connections configured to communicate traffic of respective ones of the plurality of DRBs.

Example 46 includes the subject matter of Example 45, and optionally, comprising receiving from the UE mapping information to map the plurality of DRBs to a plurality of UDP ports at the UE.

Example 47 includes the subject matter of any one of Examples 40-44, and optionally, wherein the offloading tunnel comprises at least one UDP tunneling connection to communicate traffic of two or more DRBs, the method comprising identifying a DRB of the two or more DRBs based on a header of a UDP payload communicated over the UDP tunneling connection.

Example 48 includes the subject matter of any one of Examples 40-47, and optionally, comprising transmitting configuration information to the UE, the configuration information including an address of a WLAN Access Point (AP), and UDP information of a UDP server at the eNB.

Example 49 includes the subject matter of Example 48, and optionally, wherein the UDP information includes an Internet Protocol (IP) address of the UDP server, and at least one UDP port number of the UDP server.

Example 50 includes the subject matter of any one of Examples 40-49, and optionally, wherein the plurality of DRBs corresponds to a plurality of Evolved Packet switched System (EPS) bearers.

Example 51 includes a product including one or more tangible computer-readable non-transitory storage media comprising computer-executable instructions operable to, when executed by at least one computer processor, enable the at least one computer processor to implement at a User Equipment (UE) a method comprising receiving configuration information from an evolved Node B (eNB), the configuration information including an address of a Wireless Local Area Network (WLAN) Access Point (AP), and User Datagram Protocol (UDP) information of a UDP server at the eNB; establishing a tunnel including one or more UDP tunneling connections between the UE and the eNB via the WLAN based on the configuration information, the one or more UDP tunneling connections being configured to differentiate between traffic of a plurality of Data Radio Bearers (DRBs); moving one or more DRBs of the plurality of DRBs from a cellular link to the tunnel; and moving at least one DRB of the one or more DRBs back to the cellular link.

Example 52 includes the subject matter of Example 51, and optionally, wherein the method comprises receiving from the eNB offloading information corresponding to the one or more DRBs, the offloading information including identifiers of the one or more DRBs.

Example 53 includes the subject matter of Example 52, and optionally, wherein the method comprises sending to the eNB a request to offload the one or more DRBs, and receiving the offloading information in response to the request to offload the one or more DRBs.

Example 54 includes the subject matter of Example 52, and optionally, wherein the method comprises receiving the offloading information as part of a request to offload the one or more DRBs; determining whether to accept or reject the request to offload the one or more DRBs; and transmitting to the eNB a response to indicate whether the request to offload the one or more DRBs is accepted or rejected.

Example 55 includes the subject matter of any one of Examples 52-54, and optionally, wherein the offloading information includes triggering information defining one or more trigger conditions, and wherein moving the DRB back to the cellular link comprises moving the DRB back to the cellular link based on the trigger conditions.

Example 56 includes the subject matter of any one of Examples 52-54, and optionally, wherein the method comprises receiving from the eNB a command to move the DRB back to the cellular link.

Example 57 includes the subject matter of any one of Examples 51-56, and optionally, wherein establishing the tunnel comprises establishing a plurality of UDP tunneling connections configured to communicate traffic of respective ones of the plurality of DRBs.

Example 58 includes the subject matter of Example 57, and optionally, wherein the method comprises assigning to the plurality of UDP connections a respective plurality of different UDP ports at the UE.

Example 59 includes the subject matter of Example 58, and optionally, wherein the method comprises transmitting mapping information to the eNB, the mapping information mapping the plurality of DRBs to the plurality of UDP ports.

Example 60 includes the subject matter of any one of Examples 51-59, and optionally, wherein establishing the tunnel comprises establishing at least one UDP tunneling connection to communicate traffic of two or more DRBs, the method comprises assigning a control header to a UDP payload communicated over the UDP tunneling connection, the UDP payload including an identifier to identify a DRB of the two or more DRBs.

Example 61 includes the subject matter of any one of Examples 51-60, and optionally, wherein the UDP information includes an Internet Protocol (IP) address of the UDP server, and at least one UDP port number of the UDP server.

Example 62 includes the subject matter of any one of Examples 51-61, and optionally, wherein the method comprises receiving from the eNB a Radio Resource Control (RRC) message including the configuration information.

Example 63 includes the subject matter of any one of Examples 51-62, and optionally, wherein the plurality of DRBs corresponds to a plurality of Evolved Packet switched System (EPS) bearers.

Example 64 includes a product including one or more tangible computer-readable non-transitory storage media comprising computer-executable instructions operable to, when executed by at least one computer processor, enable the at least one computer processor to implement at an Evolved Node B (eNB) a method comprising communicating with a User Equipment (UE) traffic of a plurality of Data Radio Bearers (DRBs) via a cellular link; establishing an offloading tunnel between the UE and the eNB to tunnel the DRBs via a Wireless Local Area Network (WLAN) link, the offloading tunnel including one or more User Datagram Protocol (UDP) tunneling connections configured to differentiate between the plurality of DRBs; and coordinating with the UE a handover of at least one DRB of the plurality of DRBs to the offloading tunnel.

Example 65 includes the subject matter of Example 64, and optionally, wherein the method comprises selecting the DRB, transmitting to the UE a Radio Resource Control (RRC) request message to handover the DRB, and receiving from the UE a RRC response message in response to the RRC request message, the RRC request message including an identifier of the DRB.

Example 66 includes the subject matter of Example 64, and optionally, wherein the method comprises receiving from the UE a Radio Resource Control (RRC) request message to handover the DRB, and transmitting to the UE a RRC response message in response to the RRC request message, the RRC response message to acknowledge or reject the handover of the DRB.

Example 67 includes the subject matter of any one of Examples 64-66, and optionally, wherein the method comprises defining one or more conditions to trigger moving the DRB back to the cellular link, and transmitting to the UE a message including trigger information corresponding to the one or more conditions.

Example 68 includes the subject matter of any one of Examples 64-66, and optionally, wherein the method comprises transmitting to the UE a command to move the DRB back to the cellular link.

Example 69 includes the subject matter of any one of Examples 64-68, and optionally, wherein the offloading tunnel comprises a plurality of UDP tunneling connections configured to communicate traffic of respective ones of the plurality of DRBs.

Example 70 includes the subject matter of Example 69, and optionally, wherein the method comprises receiving from the UE mapping information to map the plurality of DRBs to a plurality of UDP ports at the UE.

Example 71 includes the subject matter of any one of Examples 64-68, and optionally, wherein the offloading tunnel comprises at least one UDP tunneling connection to communicate traffic of two or more DRBs, the method comprising identifying a DRB of the two or more DRBs based on a header of a UDP payload communicated over the UDP tunneling connection.

Example 72 includes the subject matter of any one of Examples 64-71, and optionally, wherein the method comprises transmitting configuration information to the UE, the configuration information including an address of a WLAN Access Point (AP), and UDP information of a UDP server at the eNB.

Example 73 includes the subject matter of Example 72, and optionally, wherein the UDP information includes an Internet Protocol (IP) address of the UDP server, and at least one UDP port number of the UDP server.

Example 74 includes the subject matter of any one of Examples 64-73, and optionally, wherein the plurality of DRBs corresponds to a plurality of Evolved Packet switched System (EPS) bearers.

Example 75 includes a User Equipment (UE) comprising means for receiving configuration information from an evolved Node B (eNB), the configuration information including an address of a Wireless Local Area Network (WLAN) Access Point (AP), and User Datagram Protocol (UDP) information of a UDP server at the eNB; means for establishing a tunnel including one or more UDP tunneling connections between the UE and the eNB via the WLAN based on the configuration information, the one or more UDP tunneling connections being configured to differentiate between traffic of a plurality of Data Radio Bearers (DRBs); means for moving one or more DRBs of the plurality of DRBs from a cellular link to the tunnel; and means for moving at least one DRB of the one or more DRBs back to the cellular link.

Example 76 includes the subject matter of Example 75, and optionally, comprising means for receiving from the eNB offloading information corresponding to the one or more DRBs, the offloading information including identifiers of the one or more DRBs.

Example 77 includes the subject matter of Example 76, and optionally, comprising means for sending to the eNB a request to offload the one or more DRBs, and receiving the offloading information in response to the request to offload the one or more DRBs.

Example 78 includes the subject matter of Example 76, and optionally, comprising means for receiving the offloading information as part of a request to offload the one or more DRBs; determining whether to accept or reject the request to offload the one or more DRBs; and transmitting to the eNB a response to indicate whether the request to offload the one or more DRBs is accepted or rejected.

Example 79 includes the subject matter of any one of Examples 76-78, and optionally, wherein the offloading information includes triggering information defining one or more trigger conditions, and wherein moving the DRB back to the cellular link comprises moving the DRB back to the cellular link based on the trigger conditions.

Example 80 includes the subject matter of any one of Examples 76-79, and optionally, comprising means for receiving from the eNB a command to move the DRB back to the cellular link.

Example 81 includes the subject matter of any one of Examples 75-80, and optionally, wherein establishing the tunnel comprises establishing a plurality of UDP tunneling connections configured to communicate traffic of respective ones of the plurality of DRBs.

Example 82 includes the subject matter of Example 81, and optionally, comprising means for assigning to the plurality of UDP connections a respective plurality of different UDP ports at the UE.

Example 83 includes the subject matter of Example 82 comprising means for transmitting mapping information to the eNB, the mapping information mapping the plurality of DRBs to the plurality of UDP ports.

Example 84 includes the subject matter of any one of Examples 75-83, and optionally, wherein establishing the tunnel comprises establishing at least one UDP tunneling connection to communicate traffic of two or more DRBs, the UE comprising means for assigning a control header to a UDP payload communicated over the UDP tunneling connection, the UDP payload including an identifier to identify a DRB of the two or more DRBs.

Example 85 includes the subject matter of any one of Examples 75-84, and optionally, wherein the UDP information includes an Internet Protocol (IP) address of the UDP server, and at least one UDP port number of the UDP server.

Example 86 includes the subject matter of any one of Examples 75-85, and optionally, comprising means for receiving from the eNB a Radio Resource Control (RRC) message including the configuration information.

Example 87 includes the subject matter of any one of Examples 75-86, and optionally, wherein the plurality of DRBs corresponds to a plurality of Evolved Packet switched System (EPS) bearers.

Example 88 includes an Evolved Node B (eNB) comprising means for communicating with a User Equipment (UE) traffic of a plurality of Data Radio Bearers (DRBs) via a cellular link; means for establishing an offloading tunnel between the UE and the eNB to tunnel the DRBs via a Wireless Local Area Network (WLAN) link, the offloading tunnel including one or more User Datagram Protocol (UDP) tunneling connections configured to differentiate between the plurality of DRBs; and means for coordinating with the UE a handover of at least one DRB of the plurality of DRBs to the offloading tunnel.

Example 89 includes the subject matter of Example 88, and optionally, comprising means for selecting the DRB, transmitting to the UE a Radio Resource Control (RRC) request message to handover the DRB, and receiving from the UE a RRC response message in response to the RRC request message, the RRC request message including an identifier of the DRB.

Example 90 includes the subject matter of Example 88, and optionally, comprising means for receiving from the UE a Radio Resource Control (RRC) request message to handover the DRB, and transmitting to the UE a RRC response message in response to the RRC request message, the RRC response message to acknowledge or reject the handover of the DRB.

Example 91 includes the subject matter of any one of Examples 88-90, and optionally, comprising means for defining one or more conditions to trigger moving the DRB back to the cellular link, and transmitting to the UE a message including trigger information corresponding to the one or more conditions.

Example 92 includes the subject matter of any one of Examples 88-90, and optionally, comprising means for transmitting to the UE a command to move the DRB back to the cellular link.

Example 93 includes the subject matter of any one of Examples 88-92, and optionally, wherein the offloading tunnel comprises a plurality of UDP tunneling connections configured to communicate traffic of respective ones of the plurality of DRBs.

Example 94 includes the subject matter of Example 93, and optionally, comprising means for receiving from the UE mapping information to map the plurality of DRBs to a plurality of UDP ports at the UE.

Example 95 includes the subject matter of any one of Examples 88-92, and optionally, wherein the offloading tunnel comprises at least one UDP tunneling connection to communicate traffic of two or more DRBs, the eNB comprising means for identifying a DRB of the two or more DRBs based on a header of a UDP payload communicated over the UDP tunneling connection.

Example 96 includes the subject matter of any one of Examples 88-95, and optionally, comprising means for transmitting configuration information to the UE, the configuration information including an address of a WLAN Access Point (AP), and UDP information of a UDP server at the eNB.

Example 97 includes the subject matter of Example 96, and optionally, wherein the UDP information includes an Internet Protocol (IP) address of the UDP server, and at least one UDP port number of the UDP server.

Example 98 includes the subject matter of any one of Examples 88-97, and optionally, wherein the plurality of DRBs correspond to a plurality of Evolved Packet switched System (EPS) bearers.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A User Equipment (UE) comprising:
   a radio to receive configuration information from an evolved Node B (eNB), the configuration information including an address of a Wireless Local Area Network (WLAN) Access Point (AP), and User Datagram Protocol (UDP) information of a UDP server at said eNB; and
   a controller to establish one or more UDP tunneling connections between said UE and said eNB via said WLAN based on said configuration information, the one or more UDP tunneling connections being configured to differentiate between traffic of a plurality of Data Radio Bearers (DRBs).

2. The UE of claim 1, wherein said radio is to receive from said eNB offloading information corresponding to a DRB of said plurality of DRBs, the offloading information including an identifier of the DRB, and wherein said controller is to move the DRB from a cellular link between the UE and the eNB to a UDP tunneling connection corresponding to said DRB.

3. The UE of claim 2, wherein said radio is to receive said offloading information as part of a request to offload said DRB, said controller is to determine whether to accept or reject the request to offload said DRB, and said radio is to transmit to said eNB a response to indicate whether the request to offload said DRB is accepted or rejected.

4. The UE of claim 2, wherein said offloading information includes triggering information defining one or more trigger conditions, and wherein said controller is to move the DRB from the UDP tunneling connection back to said cellular link based on the trigger conditions.

5. The UE of claim 1, wherein said controller is to establish a plurality of UDP tunneling connections configured to communicate traffic of respective ones of said plurality of DRBs.

6. The UE of claim 5, wherein said controller is to assign to said plurality of UDP connections a respective plurality of different UDP ports at said UE.

7. The UE of claim 6, wherein said radio is to transmit mapping information to said eNB, the mapping information mapping the plurality of DRBs to said plurality of UDP ports.

8. The UE of claim 1, wherein said controller is to establish at least one UDP tunneling connection to communicate traffic of two or more DRBs, said controller to assign a control header to a UDP payload communicated over the UDP tunneling connection, the UDP payload including an identifier to identify a DRB of the two or more DRBs.

9. The UE of claim 1 comprising:
   one or more antennas;
   a processor;
   a memory;
   an input unit; and
   an output unit.

10. An evolved Node B (eNB) comprising:
    a radio to communicate with a User Equipment (UE) traffic of a plurality of Data Radio Bearers (DRBs) via a cellular link; and
    a controller to establish an offloading tunnel between the UE and the eNB to tunnel said DRBs via a Wireless Local Area Network (WLAN) link, the offloading tunnel including one or more User Datagram Protocol (UDP) tunneling connections configured to differentiate between said plurality of DRBs,
    wherein said controller is to coordinate with said UE a handover of at least one DRB of said plurality of DRBs to said offloading tunnel.

11. The eNB of claim 10, wherein said controller is to select the DRB, and the radio is to transmit to said UE a Radio Resource Control (RRC) request message to handover the DRB, and to receive from the UE a RRC response message in response to said RRC request message, the RRC request message including an identifier of said DRB.

12. The eNB of claim 10, wherein said radio is to receive from said UE a Radio Resource Control (RRC) request message to handover the DRB, and to transmit to the UE a RRC response message in response to said RRC request message, the RRC response message to acknowledge or reject the handover of the DRB.

13. The eNB of claim 10, wherein said controller is to define one or more conditions to trigger moving said DRB back to said cellular link, and said radio is to transmit to said UE a message including trigger information corresponding to said one or more conditions.

14. The eNB of claim 10, wherein said offloading tunnel comprises a plurality of UDP tunneling connections configured to communicate traffic of respective ones of said plurality of DRBs.

15. The eNB of claim 10, wherein said offloading tunnel comprises at least one UDP tunneling connection to communicate traffic of two or more DRBs, said controller to identify a DRB of the two or more DRBs based on a header of a UDP payload communicated over the UDP tunneling connection.

16. The eNB of claim 10, wherein said radio is to transmit configuration information to said UE, the configuration information including an address of a WLAN Access Point (AP), and UDP information of a UDP server at said eNB.

17. The eNB of claim 16, wherein said UDP information includes an Internet Protocol (IP) address of said UDP server, and at least one UDP port number of the UDP server.

18. The eNB of claim 10 comprising:
one or more antennas;
a processor; and
a memory.

19. A method performed at an evolved Node B (eNB), the method comprising:
communicating with a User Equipment (UE) traffic of a plurality of Data Radio Bearers (DRBs) via a cellular link;
establishing an offloading tunnel between the UE and the eNB to tunnel said DRBs via a Wireless Local Area Network (WLAN) link, the offloading tunnel including one or more User Datagram Protocol (UDP) tunneling connections configured to differentiate between said plurality of DRBs; and
coordinating with said UE a handover of at least one DRB of said plurality of DRBs to said offloading tunnel.

20. The method of claim 19 comprising selecting the DRB, transmitting to said UE a Radio Resource Control (RRC) request message to handover the DRB, and receiving from the UE a RRC response message in response to said RRC request message, the RRC request message including an identifier of said DRB.

21. The method of claim 19 comprising defining one or more conditions to trigger moving said DRB back to said cellular link, and transmitting to said UE a message including trigger information corresponding to said one or more conditions.

22. A product including one or more tangible computer-readable non-transitory storage media comprising computer-executable instructions operable to, when executed by at least one computer processor, enable the at least one computer processor to implement at a User Equipment (UE) a method comprising:
receiving configuration information from an evolved Node B (eNB), the configuration information including an address of a Wireless Local Area Network (WLAN) Access Point (AP), and User Datagram Protocol (UDP) information of a UDP server at said eNB;
establishing a tunnel including one or more UDP tunneling connections between said UE and said eNB via said WLAN based on said configuration information, the one or more UDP tunneling connections being configured to differentiate between traffic of a plurality of Data Radio Bearers (DRBs);
moving one or more DRBs of said plurality of DRBs from a cellular link to said tunnel; and
moving at least one DRB of said one or more DRBs back to said cellular link.

23. The product of claim 22, wherein the method comprises receiving from said eNB offloading information corresponding to said one or more DRBs, the offloading information including identifiers of the one or more DRBs.

24. The product of claim 23, wherein said offloading information includes triggering information defining one or more trigger conditions, and wherein moving the DRB back to said cellular link comprises moving the DRB back to said cellular link based on the trigger conditions.

25. The product of claim 22, wherein establishing said tunnel comprises establishing a plurality of UDP tunneling connections configured to communicate traffic of respective ones of said plurality of DRBs.

* * * * *